United States Patent Office 2,989,415

Patented June 20, 1961

2,989,415

MAGNETIC RECORDING MEDIUM AND METHOD OF MAKING THE SAME

Paul V. Horton and Robert S. Haines, Poughkeepsie, N.Y., assignors to International Business Machines Corporation, New York, N.Y., a corporation of New York No Drawing. Filed Dec. 19, 1957, Ser. No. 703,751
10 Claims. (Cl. 117—31)

This invention relates to magnetic recording media which may be in sheet, tape, disc, cylindrical, or like form.

A simplified flow diagram of the process is as follows:

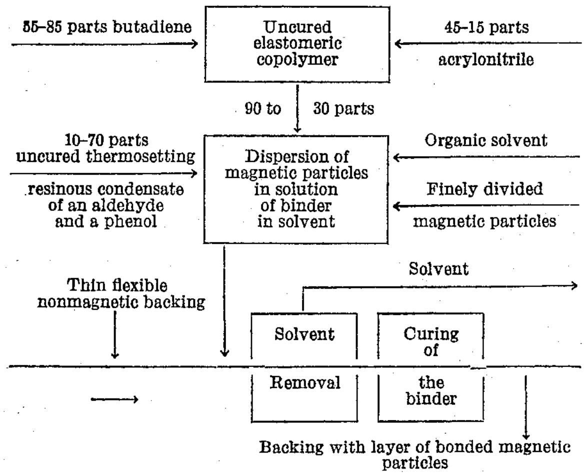

Such recording media have been made by preparing a suspension of ferro-magnetic particles in a solution of resinous binding material and an organic solvent, applying the suspension to a thin flexible nonmagnetic backing, and removing the solvent by heating, to leave a residue of the ferro-magnetic particles in the binder adhering to the flexible backing. Conventional binding media have contained all or a portion of chlorinated vinyl type polymers such as vinyl chloride, vinylidine chloride, chloroprene, neoprene, etc.

In recording signals on a magnetic recording medium, more particularly in the form of a thin narrow continuous tape which may be wound on reels, the tape is pulled by a rotating capstan past a stationary magnetic head which "writes" or "reads" signals impressed on the tape. In this process the loss of active material, i.e., the ferro-magnetic particles, from the tape is a serious disadvantage for the following reasons. The removal of ferro-magnetic particles by flaking due to poor adhesion causes loss of the signal either before or after "writing" or "reading." Active material may be lost also by "dusting" of a binder having poor abrasion resistance or by "rub off" of traces of a soft binder. Loss of active material in whatever form is indicative of wear and the useful life of the tape is decreased. A deposit can also be built up on the magnetic head if a poor binding medium is used, resulting in distortion of the signal and in lower efficiency of "writing" and "reading."

When magnetic tapes are used in computers, the speed at which the tape travels is greater than that in high fidelity recording or reproduction. Hence, the loss of active material by one or several methods referred to above is greatly increased. Conventional types of recording media used in the past have suffered from poor abrasion resistance and hence have had the foregoing serious disadvantages.

Another requirement of magnetic recording tape is that it be wound and rewound on reels without sticking or jerking or changing dimensionally. To do this the magnetic coating must be firmly bonded, flexible, and show correct hardness and shock resistance to withstand such use conditions. When magnetic tapes are wound and rewound on reels at high speed as in computers, superior binding media are needed to withstand more rigorous conditions and to meet the criteria set forth above.

A further requirement of magnetic recording tape is that it can be stored on reels for periods of years without loss of "writing" or "rewriting" signals, without adjacent convolutions of the roll of tape sticking together and without embrittlement or softening of the binding medium by exposure to air, light, moderately high and low temperatures or other environmental conditions.

Still a further requirement of magnetic tapes, more particularly tapes used for computers, is that they withstand exposure to high ozone concentration developed by the electrical equipment in some computers.

It is also desirable that the magnetic tape binding media not deteriorate when exposed to normal cleaning solvents, or fats, acids, etc. encountered in handling and using the tape. Such solvents include normal chlorinated and/or fluorinated hydrocarbon cleaning solvents such as carbon tetrachloride, certain grades of "Freon," "Techsolv 928," etc.

Another disadvantage of conventional tapes and binding media is that restrictions have been placed upon the type of equipment, i.e., ball mills and attritors utilized in preparing and grinding the ferro-magnetic component. In many cases it has been necessary to use pebble or porcelain mills rather than steel mills because small amounts of metal which are picked up in such equipment have caused a viscosity increase or gelling and polymer degradation particularly in the case of chlorinated vinyl type polymers. The pebble and the porcelain mills have required longer time for treatment thereby resulting in an increased expense. Moreover, it has generally not been possible to use metallic iron as the ferro-magnetic material for similar reasons.

Still another requirement of a magnetic recording medium is ultra-uniform thickness which in case of a recording tape means extreme uniformity of the layer of binder and ferro-magnetic material deposited on the tape backing. In many cases using conventional methods and materials it has been difficult to meet this criterion.

One object of the invention is to prepare a magnetic recording medium that has superior resistance to abrasion.

Another object is to prepare a recording medium that has reduced tendency to be subject to dusting and flaking due to poor adhesion of the magnetic particles which are bound to the supporting sheet of the magnetic medium.

Still another object is to prepare a magnetic medium that will withstand the more rigorous conditions to which it is subjected in high speed computing mechanisms.

Another object is to prepare a magnetic recording medium that may be wound and rewound on the reels without sticking or jerking or changing dimensionally, and which is firmly bonded, flexible and shows correct hardness and shock resistance to withstand these use conditions, and a medium that can be stored on reels for a period of years without loss of "writing" or "rewriting" signals, without adjacent convolutions of the roll of tape sticking together and without embrittlement or softening of the binding medium by exposure to environmental conditions.

Still another object is to prepare a recording medium that will withstand exposure to high ozone concentration developed by some electrical equipment.

Another object is to prepare a magnetic tape that does not deteriorate when exposed to normal cleaning solvents, fats, or acids, etc. encountered in handling and using the tape.

Yet another object of the invention is to prepare a binder for a recording medium that will permit the use of iron rather than iron oxide, i.e., one that does not undergo degradation in the presence of iron. Such a medium can also be processed in steel ball mills, attritors, etc. which is frequently desirable.

Another object of the invention is to prepare a binder for a recording medium from which a very uniform layer of the binder and magnetic particles on the supporting sheet can be produced.

According to the present invention, a magnetic recording medium comprising a thin flexible non-magnetic backing and a firmly adhering attached magnetic coating is prepared, the coating being a uniform dispersion of magnetic particles in a binder, the binder consisting essentially of a cured blend of about 90–30 parts by weight of an elastomeric copolymer of butadiene and acrylonitrile, and about 10–70 parts by weight of an uncured thermosetting resinous condensate of an aldehyde and a phenol. The copolymer referred to contains about 55–85 parts by weight of butadiene and about 45–15 parts by weight of acrylonitrile. Several modifications of the invention and preferred embodiments thereof are described hereinafter. Such a recording medium containing magnetic particles in the binder described, has superior resistance to abrasion, permits the use of iron as the magnetic material and meets the other criteria set forth above.

Suitable copolymers of butadiene and acrylonitrile that may be used, and procedure for preparing them are described in the United States Patent No. 2,459,739. They may include conventional rubber compounding ingredients such as curing agents, accelerators, retarders, antioxidants, etc. Such copolymers are not generally regarded as being extensively compatible with the phenolic resins. However, it has been found that a greater variety of phenolic resins are compatible with copolymers resulting from the use of a higher weight percent of butadiene than the weight present of acrylonitrile. Copolymers used in this binding medium ranged from 55 to 85 weight percent of butadiene and 45 to 15 weight percent of acrylonitrile. These weight percents refer to the amount of combined butadiene and acrylonitrile in the copolymer.

Procedures common to the industry, and as disclosed in the United States Patent No. 2,459,739 were used alone and in combination with each other in getting better butadiene-acrylonitrile copolymer-phenolic resin compatability. Some of such procedures were as follows: the use of freshly prepared copolymers, since phenolic resins are more compatible with freshly prepared copolymers than aged copolymers; the repeated milling at regular intervals of the coplymer before and after the addition of the phenolic resin; the use of butadiene-acrylonitrile copolymers which had "modifying" or "regulating agents" added during polymerization, i.e., as disclosed in the Wollthan United States Patent No. 2,281,613; the milling of solutions or dispersions of the butadiene-acrylonitrile copolymer and phenolic resins with the ferro-magnetic particles. These procedures besides enhancing the compatability of the phenolic resins and the butadiene-acrylonitrile copolymers also result in butadiene-acrylonitrile copolymers with a high "sol" and low "gel" content, as desired. Butadiene-acrylonitrile copolymer when used in crumb form, may be dusted with a vinyl polymer such as vinyl chloride.

The compatibility of the phenolic resins with the butadiene-acrylonitrile copolymer can be increased by incorporating a small amount of raw cashew nut shell liquid or modified cashew nut shell liquids, as described in the United States Patent No. 2,325,981. Such modified liquids include heat-treated cashew nut shell liquid, polymerized cashew nut shell liquid or the reaction product of the above cashew nut shell liquids combined separately or together with phenols (such as the mono and polyhydroxyl substitution products of benzene, naphthalene and their homologues) with aldehydes such as formaldehydes, paraformaldehyde, acetaldehyde, benraldehyde or with methylene-containing bodies such as hexamethylene tetramine. The incorporation of a small percentage of the above cashew nut shell liquids or resins also acts as a "keying agent" to bind the binding medium to the tape backing web. Other compounds that act as keying agents include phenol and isocyanate-substituted phenols such as 4,4′-methylene bis phenol isocyanate. The amount of keying agent is from 0.1 to 2 percent of the weight of the binding medium solids.

The phenolic resins, the other principal constituent of the abrasion resistant binding medium, are produced by condensing phenolic compounds with aldehydic compounds, as described, for example, in the United States Patent No. 2,459,739. The phenols suitable for these resins are illustrated by phenol, cresols, xylenols, resorcinol, naphthols, the various alkylated, alkylolated, carboxylated, etc., derivatives of phenols of the above types such as tertiary butyl phenol, carvacrol, salicyclic acid, etc. The aldehydes suitable for these resins are illustrated by formaldehyde, acetaldehyde, benzaldehyde, hydroxybenzaldehyde, propionaldehyde, etc.

Phenolic resins are produced by condensing an aldehyde and phenol in the presence of acidic or basic catalysts. The acidic condensed resins are usually neutralized upon the conclusion of the condensation process with a basic substance such as hexamethylene tetramine. The hexamethylene tetramine, besides neutralizing the resin, also serves as a curing agent. Examples of these acid condensed resins are the two-step "novolak" resins. Examples are: SP–6600, manufactured by Schenectady Varnish Co., Inc., or Durez 12687, manufactured by Durex Plastics Divisions of Hooker Electromechanical Co. Phenolic resins produced by basic catalysts may also be used singularly and in conjunction with acid catalyzed phenolic resins.

Phenolic resins are known to condense in several transitionary stages, forming first a soluble resin, which passes first to an insoluble but fusible resin and then to an insoluble and infusible resin. The phenolic resins used for blending intimately with the butadiene-acrylonitrile in this invention were not generally carried beyond the soluble stage and definitely not to the insoluble and infusible stage.

Several methods were used for blending intimately the butadiene-acrylonitrile copolymer and heat sensitive phenolic resins such as: passing the copolymer over a hot or cold mill or calender, then working the heat sensitive phenolic resin into this milled copolymer on a cold mill; blending solvent solutions and/or dispersions of relatively "gel" free copolymer and phenolic resin components together in high speed or high shear mixers or agitators; blending solvent solutions and/or dispersions of the copolymer and phenolic resin components together in a ball, pebble mill or attritors while grinding and dispersing the ferro-magnetic particles.

The weight percent of phenolic resin entering into the composition of the abrasion resistant adhesive varied from 10 to 50% when curing agents were added to cure the butadiene-acrylonitrile copolymer and from 50–70 weight percent when none or limited amounts of curing agents were added.

The magnetic material incorporated in the binder is preferably a ferro-magnetic material, suitably nonacicular magnetic oxide such as gamma $Fe_2O_3$, or $Fe_3O_4$; however, the crude magnetite having an $Fe_3O_4$ content of 90–100% is preferably used. Other suitable ferro-magnetic materials include magnetic red iron oxide, acicular magnetic iron oxide and the acicular ferrosoferric oxide $Fe_3O_4$ or gamma $Fe_2O_3$ produced by the method described in the United States Patent No. 2,694,656. The ferro-magnetic material used is treated to secure certain desired values of coercive force, remanence, etc. before incorporation in the tape structure.

In preparing magnetic recording tapes from the abrasion resistant adhesive binder of the invention it is desirable to maintain certain ratios of ferro-magnetic particles to binding medium. Superior recording tapes are produced when the volume ratio of the ferro-magnetic particles to binding medium is 1:3 to 10:11. For iron oxide with a specific gravity of 5.2 the weight ratio is 2:1 to 4:1, and 2.9:1 to 6:1 for iron having a specific gravity of 7.7. The weight ratio of other ferro-magnetic particles to binding medium will increase if their specific gravity is greater than the above, or decrease if their specific gravity is less than the above specific gravities.

The backing for the recording medium is preferably a low stretch nonfibrous film such as a cellulose acetate or polyester film of the terephthalic acid-ethylene glycol type, an example of which is "Mylar." Similarly, thin paper or other fibrous backings or films containing reinforcing fibers may be utilized for this purpose.

In preparing the dispersion for application to the flexible nonmagnetic backing, the magnetic material is mixed with a solution of the binder in an organic solvent which is then placed in a steel ball mill or attritor and milled until the solid particles have been ground to a suitable degree of fineness. The actual grinding time is continued until the magnetic remanence of the ferro-magnetic particles has reached the desired maximum, i.e., of the order of 40 hours. At this point, if the viscosity of the solution is too high, sufficient solvent is added to reduce the viscosity and the mix is milled for an additional hour. The concentration of the binder and dispersed solids in the organic solvent preferably corresponds with a ratio of about 1 part of binder plus dispersed solids by volume to 8 parts by volume of solvent.

The dispersion of ferro-magnetic particles in the organic solvent solution is applied to the surface of the flexible nonmagnetic backing by spraying, roll coating, brushing, or other similar techniques and the solvent is allowed to evaporate, thereby depositing onto the backing a uniform smooth film of the binder containing the particles of ferro-magnetic material uniformly dispersed therein and bonded to the flexible backing. The binder is cured, for example by heating at an elevated temperature for the required time.

The following examples will serve as specific illustrations of the use of the novel abrasion resistant adhesive binding medium for magnetic particles in preparing magnetic recording tape. The parts indicated are by weight unless otherwise expressed.

*Example I*

A freshly prepared "modified" copolymer of butadiene-acrylonitrile with very low "gel" content was blended in the ratio shown below with the phenolic resins and methyl ethyl ketone as a dispersing agent and solvent in a high shear mixer until an intimately blended non-settling dispersion was obtained. This dispersion was then added to an attritor with ferro-magnetic material (natural magnetite, $Fe_3O_4$), toluene, methyl ethyl ketone and methyl isobutyl ketone shown in the formula below and the resultant mixture attrited until the ferro-magnetic particles were reduced in size to 1–2 micron size and uniformly dispersed in the binding medium as observed with a good microscope. The necessary copolymer curing agents and antioxidants were then dispersed in this mixture and the resulting dispersion filtered to remove the last traces of "gel" (the filter being coarse enough to permit the ferro-magnetic particles to pass), and applied to a web of 0.0015 inch thick "Mylar" in a coating machine. The resulting magnetic recording tape was then heated at from 200° F. to 350° F. until the binder of the tape was free from solvent and had cured.

| | Parts |
|---|---|
| A freshly prepared "modified" copolymer of butadiene-acrylonitrile with 33 to 35% combined acrylonitrile plus antioxidants | 70 |
| Tertiary butyl phenol formaldehyde condensation products containing 6–8% hexamethylene tetramine (two stage "novolak" type heat-setting phenolic resin) | 30 |
| Poly (hydroxy phenyl) pentadecanes containing bisphenol plus hexamethylentetramine (modified cashew nut shell liquid) | 0.4 |
| Iron oxide | 300 |
| Methyl ethyl ketone | 372 |
| Methyl isobutyl ketone | 122 |
| Toluene | 122 |
| Zinc oxide | 3.5 |
| Sulfur | 1.8 |
| Stearic acid | 0.7 |
| 2-mercaptobenzothiazole | 1.8 |
| 50% solution of N,N-dimethylcyclohexylamine salt of dibutyldithiocarbamic acid | 1.8 |

*Example II*

Another recording tape was prepared from the following formula by the procedure described in Example I.

| | Parts |
|---|---|
| A freshly prepared "modified" copolymer of butadiene-acrylonitrile with 33 to 35% combined acrylonitrile plus antioxidants | 70 |
| Basic catalyzed condensation product of phenol and formaldehyde (one stage heat-setting phenolic resin) | 30 |
| Iron oxide (same as Example I) | 290 |
| Methyl ethyl ketone | 340 |
| Methyl isobutyl ketone | 340 |
| Zinc oxide | 3.5 |
| Sulfur | 1.8 |
| Stearic acid | 0.7 |
| 2-mercaptobenzothiazole (Thiotax) | 1.8 |
| 50% solution of N,N-dimethylcyclohexylamine salt of dibutyldithiocarbamic acid (R–A–50–A) | 1.8 |

*Example III*

Still another recording tape was prepared from the following formula by the procedure described in Example I.

| | Parts |
|---|---|
| A freshly prepared "modified" copolymer of butadiene-acrylonitrile with 33 to 35% combined acrylonitrile plus antioxidants | 70 |
| Phenol | 0.4 |
| Tertiary butyl phenol formaldehyde condensation product containing 6–8% hexamethylene tetramine (two stage "novalak" type heat-setting phenolic resin) | 30 |
| Iron oxide (synthetic $Fe_2O_3$ having cubic (non-acicular) structure) | 343 |
| Methyl ethyl ketone | 340 |
| Methyl isobutyl ketone | 340 |
| Zinc oxide | 3.5 |
| Sulfur | 1.8 |
| Stearic acid | 0.7 |
| 2-mercaptobenzothiazole (Thiotax) | 1.8 |
| 50% solution of N,N-dimethylcyclohexylamine salt of dibutyldithiocarbamic acid (R–Z–50–A) | 1.8 |

The ratios and kinds of solvents can be varied to include many other types of solvents since the solvents act only as dissolving and dispersing media that are removed from the abrasion resistant adhesive binding medium during the production of the magnetic recording tape. Thus they are not present in the final abrasion resistant adhesive binding medium. The particle size of the ferro-magnetic particles dispersed in the binding medium was from 0.1 to 3 microns in cross-section. The magnetic recording tape prepared from the binding medium formulations described in the examples was cured in an oven at 250° F. for 30 to 120 minutes. The heat resistance and abrasion resistance test used on the magnetic recording tapes tabulated in the examples was a practical test intended to assimilate to a high degree the heat and abrasion conditions that magnetic recording tap is exposd to when used in a computer. The tester had a driving wheel, two idling wheels, a tape cleaner, and a pressure pad and a standard computer magnetic head. Loops of tape ½ inch wide and 31 inches long were driven at the rate of 300 inches per second on the tester. The time required for destruction of the binder by wear was observed and compared with the time required for destruction of the binder by wear in commercial magnetic recording tapes. The wear (life) of the binder of the magnetic recording tapes prepared from the binding medium formulas described in the foregoing examples was thirty to forty times longer than the wear of the binders used in commercial magnetic recording tapes.

The claims are:

1. A magnetic recording medium comprising a nonmagnetic backing, and a firmly adhering attached magnetic coating, said coating being a uniform dispersion of magnetic particles in a binder, said binder consisting essentially of a cured blend of about 90–30 parts of an elastomeric copolymer of about 55–85 parts of butadiene and about 45–15 parts by weight of acrylonitrile, and about 10–70 parts by weight of an uncured thermosetting resinous condensate of an aldehyde and a phenol.

2. A magnetic recording medium as described in claim 1 wherein the binder is a cured blend of about 90–50 parts by weight of said elastomeric copolymer and about 10–50 parts by weight of said resinous condensate.

3. A magnetic recording medium as described in claim 1 wherein said magnetic particles are magnetite ore.

4. A magnetic recording medium as described in claim 1 in the form of a tape in which the backing is organic nonfibrous film.

5. A magnetic recording medium as described in claim 1 wherein said magnetic particles are elemental iron.

6. A magnetic recording medium as described in claim 4 comprising a keying agent of the group consisting of phenol, isocyanate-substituted phenols, cashew nut shell liquid and modified cashew nut shell liquids to increase the adherence of the binder for the backing.

7. A magnetic recording medium as described in claim 1 wherein the magnetic material is a ferro-magnetic material and the volume ratio of ferro-magnetic material to binder is in the approximate range from 1:3 to 10:11.

8. The method of preparing a magnetic recording medium comprising the steps of preparing a blend of about 90–30 parts by weight of an uncured elastomeric copolymer and about 10–70 parts by weight of an uncured thermosetting resinous condensate of an aldehyde and a phenol, said elastomeric copolymer having been formed from about 55–85 parts by weight of butadiene and about 45–15 parts of acrylonitrile, preparing a solution of said binder in an organic solvent, incorporating in said solution finely divided magnetic particles to form a dispersion, applying a layer of said dispersion to a thin flexible nonmagnetic backing, removing said solvent from said dispersion, and curing said binder to produce a firmly adhering abrasion resistant layer of bonded magnetic particles on said backing.

9. The method as described in claim 8 wherein a curing agent is incorporated in said blend and the relative amounts of elastomeric copolymer and resinous condensate are about 90–50 parts by weight of said elastomeric copolymer and about 10–50 parts by weight of said resinous condensate.

10. The method described in claim 8 wherein the amount of total solid ingredients in the dispersion, including dissolved and suspended solids, is not more than about 1 part by volume per 8 parts by volume of dispersion.

References Cited in the file of this patent

UNITED STATES PATENTS

| | | |
|---|---|---|
| 2,459,739 | Groten | Jan. 18, 1949 |
| 2,532,374 | Shepard et al. | Dec. 5, 1950 |
| 2,582,590 | Heeren | Jan. 15, 1952 |
| 2,607,710 | Schmelzle et al. | Aug. 19, 1952 |
| 2,684,350 | Williams | July 20, 1954 |
| 2,748,016 | Speed et al. | May 29, 1956 |
| 2,799,609 | Dalton | July 16, 1957 |
| 2,930,106 | Wrotnowski | Mar. 29, 1960 |

OTHER REFERENCES

Spratt: "Magnetic Tape Recording," London, Heywood and Company, Ltd., 1958.